2,902,123

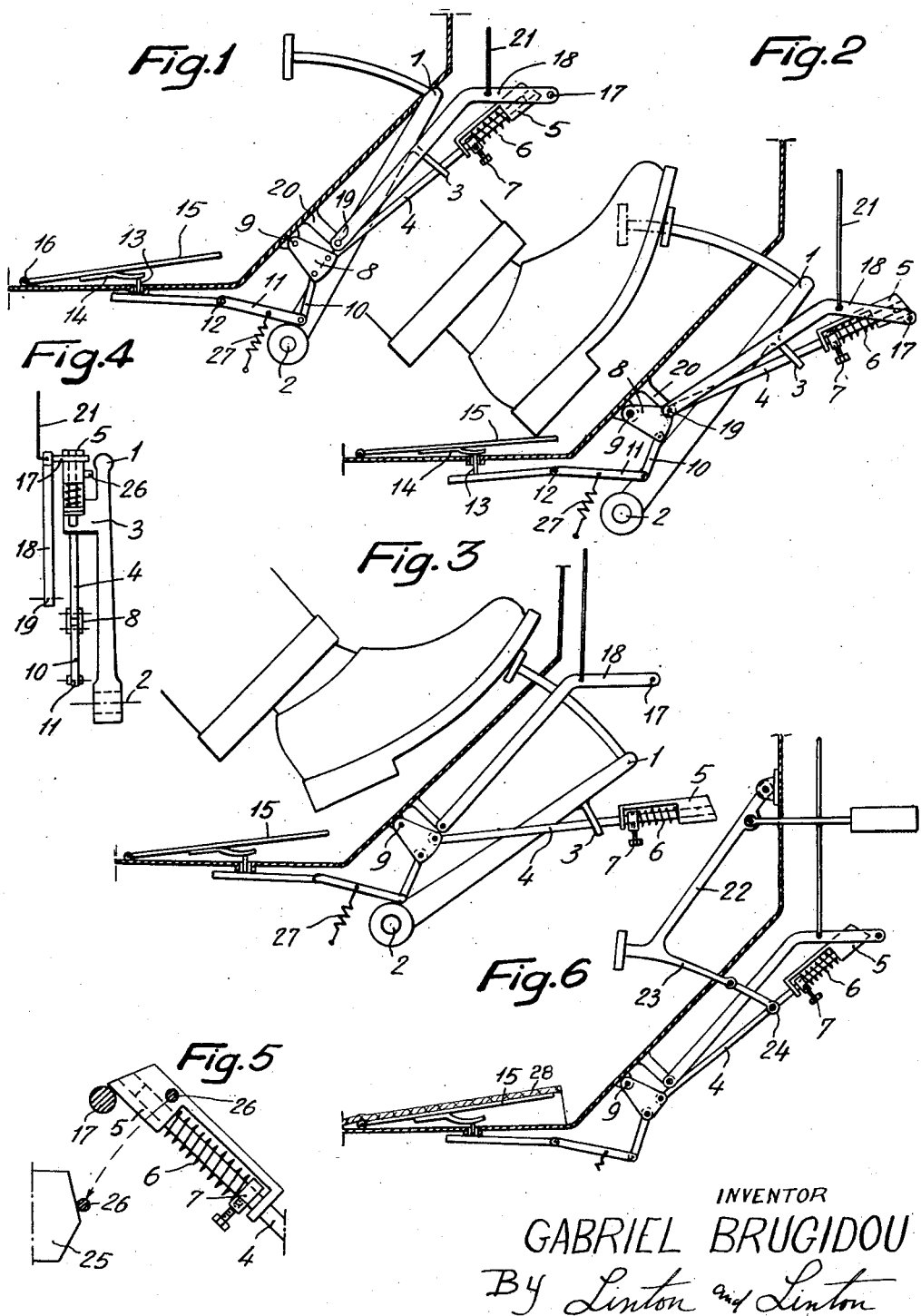

SINGLE-PEDAL THROTTLE AND BRAKE CONTROL DEVICE FOR AUTOMOTIVE VEHICLES

Gabriel Brugidou, Cauderan, France

Application April 12, 1956, Serial No. 577,867

Claims priority, application France April 13, 1955

4 Claims. (Cl. 192—3)

This invention relates to automotive vehicles and has particular reference to a single-pedal control device for operating the acceleration and deceleration of automobiles.

With the conventional pedal arrangement widely used for controlling and driving automobiles the throttle or accelerator and the braking system are both operated by means of two adjacent pedals adapted to be actuated by the same driver's foot, so that in case of emergency the brake application is retarded by the appreciable time necessary for the driver to release the throttle or accelerator pedal and depress the brake pedal. On the other hand, this brake actuation requires much skill and an elaborate reflex from the driver due to the necessity of switching over from one pedal to another, so that driving errors are much likely to occur, for example if the driver is upset by an unforeseen obstacle and has the reflex of depressing the foot without passing from one pedal to another.

It is known that the natural reflexes of the driver cause him or her to move the foot forward for accelerating and to press the same foot against the floorboard while throwing the body backward for controlling the vehicle. Both acceleration and deceleration movements are thus effected in the same direction and it would be advantageous to use a single pedal so as to avoid the unnecessary loss of time resulting for the driver when he or she sees an obstacle and wants to raise this foot and displace it laterally to reach for the brake pedal.

Various devices have already been proposed for suppressing one of the conventional pair of pedals and controlling through the same lever and the same foot the brake application and the accelerator. Thus, in a prior arrangement the brake control is actuated temporarily by the accelerator lever by utilizing the action exerted by the other foot on the clutch pedal. Various systems have been proposed wherein mechanisms adapted to connect and disconnect the brake control utilize certain reflexes of the driver whereby he or she moves the leg forward during a brake application. These systems, of which the greater part provide an operative connection between the single pedal and the braking system when the brakes are applied, are extremely dangerous and unreliable, any failure in mechanical assemblies of this character making it impossible for the driver to quickly stop the vehicle.

Now it is the essential object of this invention to avoid the inconvenience set forth hereinabove by providing a device enabling the driver to control the acceleration and deceleration of the vehicle by means of a single pedal, there being only a temporary operative connection between the throttle control and the pedal, and a permanent operative connection between the braking system and the control pedal with interlocking means preventing the two control actions from taking place simultaneously.

With the device of this invention the accelerator is locked in such a manner that it can be unlocked at any moment during the acceleration in spite of the foot pressure on the control pedal and without necessitating any variation in this pressure. Thus, the device makes it possible to switch from a light pressure for accelerating to a light brake application, and vice-versa, so that normal driving as well as parking and like maneuvers are characterised by a high degree of flexibility.

The principle on which the device of this invention is based lies on the utilization of a dead angle—whether already existing or to be provided—in the stroke of the brake pedal, for actuating the throttle control. The brake pedal actuates the throttle lever through the intermediary of a locking device providing a temporary releasable operative connection or coupling between the pedal and the throttle lever, another auxiliary pedal located beneath the driver's control foot being also provided to either establish and maintain this connection or discontinuing same.

The locking device coupling the throttle or accelerator control with the brake pedal, which is controlled by the aforesaid auxiliary pedal concealed if desired under the floorboard carpet and adapted to be engaged by the driver's heel, comprises a lug engageable behind a pin secured on a lever connected to said throttle control.

According to an essential feature of this invention, if for any reason the locking device remains coupled to the throttle-lever pin during a brake application it will engage a cam positioned in its path of motion, so as to depress this cam and at the same time the lug, so that the latter will free the pin and therefore the throttle control.

In order to afford a better understanding of this invention and of the manner in which the same may be carried out in the practice, reference will now be made to the attached drawings forming part of this specification and illustrating diagrammatically by way of example two typical embodiments of the invention. The braking system, which may be of any suitable description, is not shown in the drawings:

Figure 1 is a diagrammatical side view showing the device in its inoperative condition;

Figure 2 is a similar view showing the device in the position of maximum acceleration;

Figure 3 is another side view showing the device during a brake application;

Figure 4 is a front view of the device;

Figure 5 is a detail view showing the lug of the locking device and the safety cam, and Figure 6 shows the mounting of the device of this invention in the case of a suspended pedal.

Referring first to the embodiment shown in Figs. 1 to 5, it will be seen that the brake pedal 1 is pivoted at 2 and carries a side projection or guiding gate 3 in sliding engagement with a rod 4 constituting the locking member, to this end, the rod 4 carries at its upper or free end a locking lug 5 formed with a bevelled end face and urged by a coil spring 6 in a direction away from the pivot pin 2; this coil spring 6 bears with its opposite end against a stop ring 7 secured on the rod 4 by a set screw. The extremity of the rod 4 which is opposite to the locking lug 5 is pivoted in a member 8 consisting of a pair of spaced parallel plates of isosceles triangle shape, having their vertices pivotally mounted on a pin 9 of a fixed lug projecting from the underside of the floorboard of the vehicle. A small link 10 has one end pivotally mounted on the last vertex of the triangular member 8 and its opposite end is pivoted endwise of an arm 11 pivoted in turn on a pin 12 and constantly urged by a spring 27. The opposite end of the arm 11 carries an extension 13 actuated through a spring 14 secured beneath the auxiliary pedal 15, the latter pivoting on a pin 16 rigid with the floor. The lug 5 engages a transverse lock pin 17 secured at the outer end of a lever 18 pivoted on a pin 19 carried by a fixed lug 20 projecting from the underside of the floor, as shown. The accelerator or throttle control rod 21 has one end connected to the carburetor and the other end pivoted on an intermediate point of the lever 18.

The safety device consists of a cam 25 adapted to be engaged by a pin 26 projecting laterally from the locking lug 5.

Figure 6 illustrates the application of the control device of this invention to an automobile pedal of the suspended type.

In this figure it will be seen that the control pedal 22 carries an arm 23 having pivotally mounted at its end a link 24 connected through its opposite end to the rod 4 of the locking device. The pressure exerted on the pedal 22 is transmitted to the mechanism through the arm 23 and link 24 without producing any sliding movement along the rod 4. The locking device is the same as that described hereinabove with reference to Figs. 1 to 5.

The operation of the device described hereinabove can be readily understood. The driver of the vehicle sets his or her heel quite naturally on the auxiliary pedal 15 which may be concealed under the car carpet 28. Thus, the component elements of the device will take the positions illustrated in Fig. 2. The movement of the auxiliary pedal 15 is transmitted through the rod 13 to the lever 11 and the latter is thus pivoted about the pin 12. The pivoting movement of the lever 11 causes the link 10 to move together with the member 8 pivoting in turn about the pin 9 while pushing the rod 4 sliding in the side projection 3. The lower portion of the locking device is thus moved backwards due to the upward movement transmitted thereto by the member 8. The rod 4 is pivoted as it slides along the side projection 3 and the lug 5 engages the lock pin 17 by effecting an upward movement at the rear of this pin.

The driver actuates the throttle by depressing the control pedal 1 through an angle defining at one end the idling position and at the other end the wide-open throttle position, the latter being felt by the driver in the form of a slightly increased resistance of the linkage. Thus, the acceleration is obtained by any engine r.p.m.'s as long as the driver's heel rests on the auxiliary pedal 15. In fact, any pressure exerted on the pedal 1 is transmitted through the medium of the side projection 3 to the rod 4 and the lug 5 of this rod engages the pin 17 so as to cause the lever 18 to pivot about the pin 19; therefore this lever 18 will pull the throttle linkage 21 during the acceleration. A slight upward movement of the heel may be compensated by the resiliency of the leaf spring 14 located beneath the auxiliary pedal 15, so that this spring will keep the pressure on the lever 11. When the driver wants to apply the brake irrespective of the position occupied by the throttle control, even the idling position, for example, he or she amplifies the forward movement of the control foot. Due to the thrust and the resulting greater angle forming between the foot and the leg, the driver's heel is raised automatically, thus releasing the auxiliary pedal 15 and disconnecting the locking device. This device restored by the spring 27 is thus moved downwards, thereby causing the locking lug 5 to move both backwards and downwards, and facilitating the release of the pin 17 in spite of the foot pressure. As the pin 17 is released, the lever 18 is returned by the carburetor spring to its neutral position and the engine is allowed to idle as the brakes are applied as in conventional control systems.

When the brake application is to be discontinued the driver replaces his or her heel on the auxiliary pedal 15 and draws the control foot back, thus enabling the main pedal 1 to resume its neutral or uppermost position. Therefore the lug 5 will engage through its bevelled end face (acting as a cam-face) the pin 17, and the coil spring 6 will be compressed on the rod 4 to clear the pin 17. Then, the spring 6 will expand and the lug 5 restored to the desired and suitable level behind the pin 17, i.e. in a position ready for another acceleration.

If for any reason the lug 5 remained locked with the pin 17 during a brake application, it would engage through its lateral projecting pin 26 the aforesaid cam 25. The side pin 26 would depress the lug 5 rigid therewith, thereby releasing the pin 17. As the stroke between maximum acceleration and the engagement of cam 25 is relatively small, the inherent resiliency of the linkage is sufficient to follow the lever 18 until it is released. The engagement between the lug 5 and the pin 17 is adjustable by varying the position of the ring 7 secured on the rod 4 by a set screw, as already explained.

Of course, many modifications may be brought to the embodiments shown described herein, without departing from the spirit and scope of the invention as set forth in the appended claims.

What I claim as new is:

1. In an automotive vehicle having a floor beneath the operator's foot, a combined brake and throttle control device comprising a pivotally supported pedal for operating the brakes of said vehicle, an auxiliary pedal pivotally mounted on said vehicle floor, said pedals being positioned above the floor of said vehicle and arranged for pivoting in the same vertical plane, and locking means positioned beneath said vehicle floor and including a triangular member having one vertex thereof pivotally connected to said floor, a lever for operating the vehicle throttle pivotally connected at one end to said floor, a locking pin fixedly carried at the other end of said lever, a locking rod having one end pivotally connected to a second vertex of said triangular member, a locking lug slidably mounted on the other free end of said locking rod, a pivotally supported arm, a link pivotally connected at one end to the third vertex of said triangular member and at its other end to said arm, means operable by said auxiliary pedal for pivoting said arm and thereby said triangular member causing the engagement of said locking lug with said pin whereby said first mentioned pedal controls the vehicle throttle during the first portion of its pivoting and then the brakes during the further pivoting thereof upon the release of said auxiliary pedal disengaging said locking lug and said locking pin thereby disconnecting said first mentioned pedal from the vehicle throttle.

2. In an automobile vehicle having a floor beneath the operator's foot, a combined brake and throttle control device as claimed in claim 1 including means for limiting the sliding of said locking lug on said locking rod, resilient means tending to slide said locking lug towards said free end of said locking rod, a pin carried by said locking lug and a fixed cam for being engaged by said pin sliding said locking lug against said resilient means reengaging said locking lug with said locking pin.

3. In an automotive vehicle having a floor beneath the operator's foot, a combined brake and throttle control device as claimed in claim 1 wherein a resilient member is positioned between said auxiliary pedal and said arm permitting a slight raising of said auxiliary pedal without movement of said arm.

4. In an automotive vehicle having a floor beneath the operator's foot, a combined brake and throttle control device as claimed in claim 1, wherein a carpet is positioned over said auxiliary pedal concealing the same.

References Cited in the file of this patent

UNITED STATES PATENTS

| | | |
|---|---|---|
| 2,279,458 | Harkness | Apr. 14, 1942 |
| 2,373,028 | Kennedy | Apr. 3, 1945 |
| 2,586,111 | Maurice et al. | Feb. 19, 1952 |
| 2,620,050 | Menard | Dec. 2, 1952 |
| 2,724,469 | Bailey | Nov. 22, 1955 |

FOREIGN PATENTS

| | | |
|---|---|---|
| 1,107,083 | France | Aug. 3, 1955 |